United States Patent [19]

Kaye

[11] Patent Number: 4,954,881

[45] Date of Patent: Sep. 4, 1990

[54] METHOD AND APPARATUS FOR CORRECTING VIDEO COLOR SIGNALS

[75] Inventor: Michael C. Kaye, Agoura Hills, Calif.

[73] Assignee: Encore Video, Inc., Hollywood, Calif.

[21] Appl. No.: 159,587

[22] PCT Filed: Sep. 3, 1987

[86] PCT No.: PCT/US87/02240
§ 371 Date: Dec. 15, 1987
§ 102(e) Date: Dec. 15, 1987

[87] PCT Pub. No.: WO88/02207
PCT Pub. Date: Mar 24, 1988

Related U.S. Application Data

[63] Continuation-in-part of Ser. No. 904,692, Sep. 8, 1986, abandoned.

[51] Int. Cl.$^5$ .......................... H04N 9/75; H04N 9/68
[52] U.S. Cl. ........................................ 358/22; 358/27; 358/28; 358/80
[58] Field of Search ................ 358/22, 27, 28, 80

[56] References Cited

U.S. PATENT DOCUMENTS

| | | | |
|---|---|---|---|
| 3,255,305 | 6/1966 | Chatten | 358/21 R |
| 3,558,806 | 1/1971 | Monahan | 358/30 |
| 3,678,182 | 7/1972 | Boxman et al. | 358/22 |
| 3,959,813 | 5/1976 | Legler | 358/22 |
| 4,051,520 | 9/1977 | Davidse et al. | 358/22 |
| 4,109,278 | 8/1978 | Mendrala et al. | 358/22 |
| 4,410,908 | 10/1983 | Belmares-Sarabia et al. | 358/30 |
| 4,500,919 | 2/1985 | Schreiber | 358/78 |
| 4,525,736 | 6/1985 | Korman | 358/28 |
| 4,533,938 | 8/1985 | Hurst | 358/28 |
| 4,763,186 | 8/1988 | Belmares-Sarabia et al. | 358/22 |
| 4,811,084 | 3/1989 | Belmares-Sarabia et al. | 358/22 |
| 4,862,251 | 8/1989 | Belmares-Sarabia et al. | 358/22 |

FOREIGN PATENT DOCUMENTS

| | | | |
|---|---|---|---|
| 172082 | 10/1983 | Japan | 358/22 |
| 172083 | 10/1983 | Japan | 358/22 |
| 930749 | 5/1982 | U.S.S.R. | 358/22 |

OTHER PUBLICATIONS

Monahan and Dischert, Journal of the SMPTE, Sep. 1969, pp. 696-700, Title: Color Correction Techniques for Television Cameras.

Primary Examiner—John W. Shepperd
Attorney, Agent, or Firm—Pretty, Schroeder, Brueggemann & Clark

[57] ABSTRACT

Video signal color correction is accomplished by selecting for color correction areas of the chrominance plane defining sectors in polar coordinates. Both the angle and the width of the sector can be changed to select precisely the desired signals for color correction. Specifically, component color difference video signals which only lie within a fixed hue sector are transmitted from an input to an output. Responsive to a first control signal, the difference signals are rotated through an angle which corresponds to a selected hue sector relative to the fixed hue sector in which the component color signals are to be corrected. The rotated difference signals are applied to the input to produce at the output an isolated color signal only when the difference signals lie within the selected hue sector. The width of the fixed hue sector is reduced responsive to a second control signal. Thus, the first and second control signals permit selection of the angle and the width of the sector in which the difference signals are to be corrected.

32 Claims, 10 Drawing Sheets

SINGLE CHANNEL OF COLOR CORRECTION CIRCUITRY

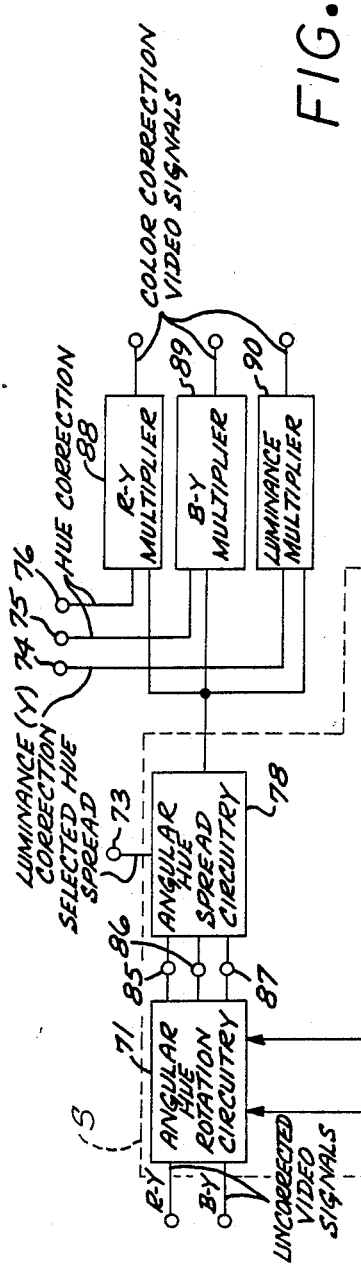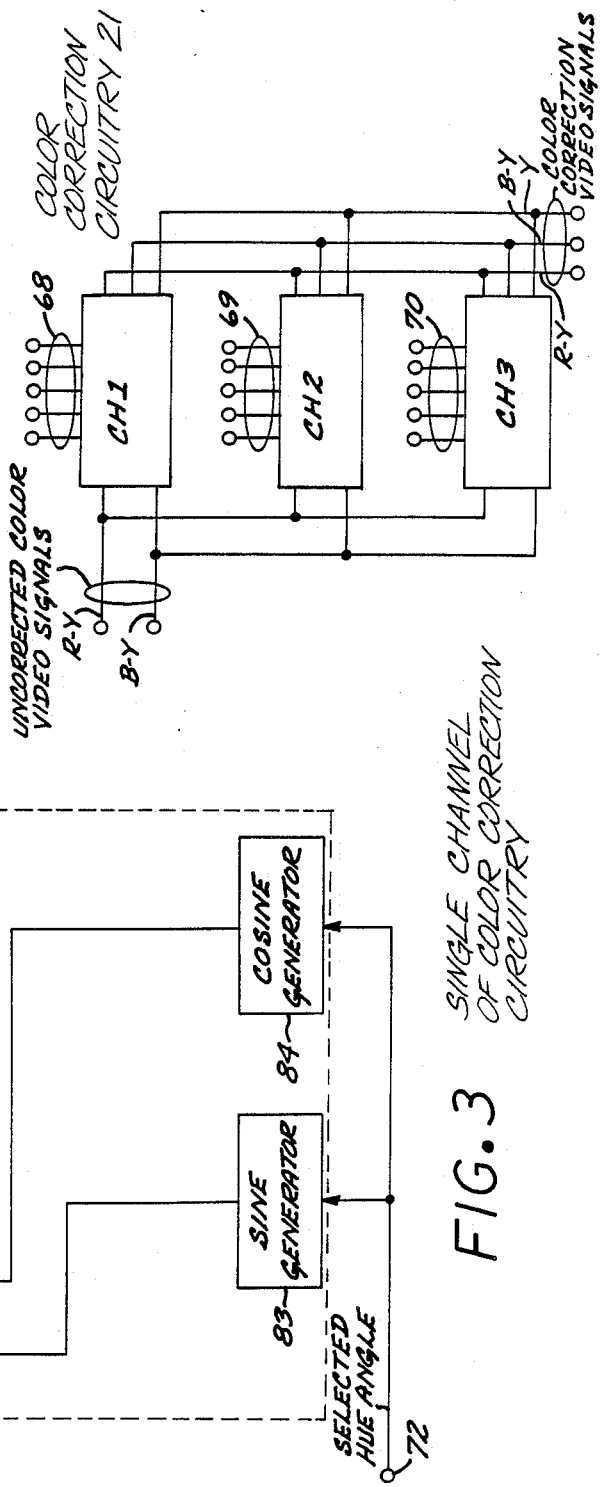

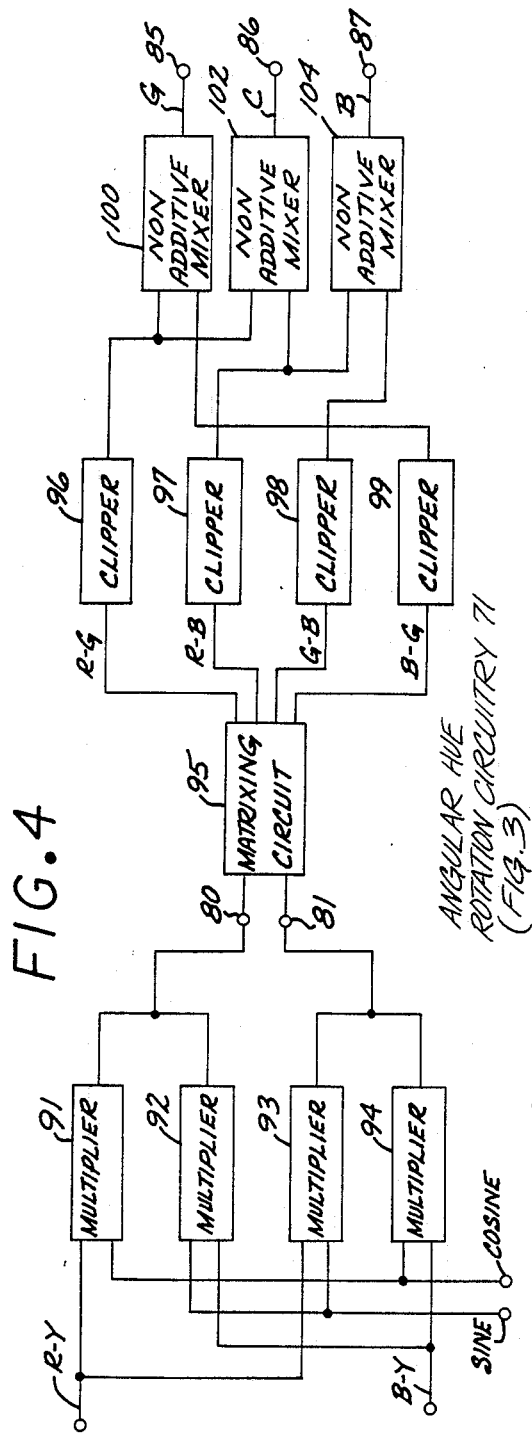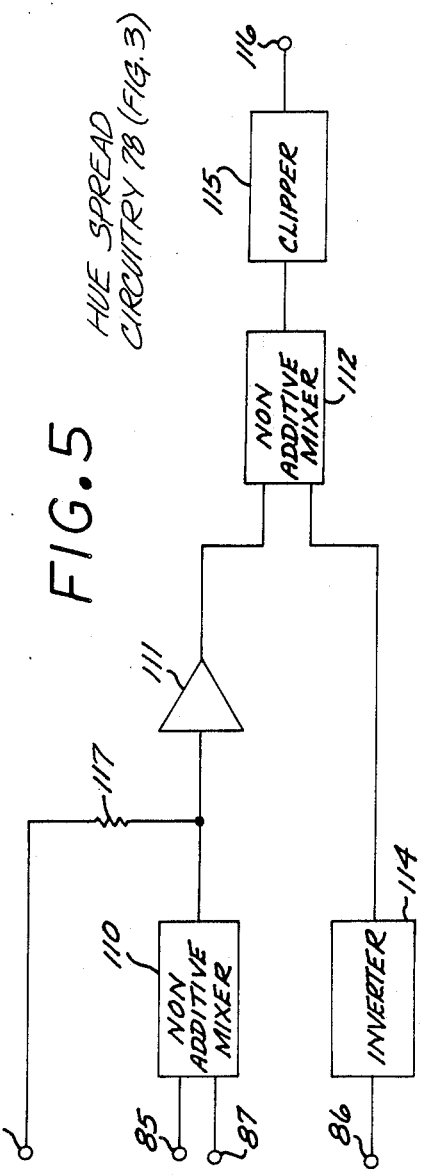

METHOD AND APPARATUS FOR CORRECTING VIDEO COLOR SIGNALS

REFERENCE TO RELATED APPLICATIONS

This application is a Continuation-in-Part of application Ser. No. 904,692, filed Sept. 8, 1986 now abandoned.

BACKGROUND OF THE INVENTION

This invention relates to correcting video color signals and, more particularly, to a method and apparatus for precisely isolating video color signals for selective color correction.

In video color recording, the images are represented by either of two sets of signals. One signal set is red/green/blue. The other signal set is luminance (Y) and color difference, i.e. red minus luminance (R-Y) and blue minus luminance (B-Y).

In the course of production of television and video color recordings, it is sometimes desirable to correct selectively the colors of the subject images. Many years ago Monahan et al. disclosed a non-linear matrixing device for color correction in U.S. Pat. No. 3,558,806. This matrixing device operates upon the red/green/blue signals to permit independent adjustment of the hue and saturation of the three primary colors, red, green, and blue, and the secondary colors, cyan, yellow, and magenta. When an object made up of more than one color is to be color corrected, a coordinated adjustment of both colors is required.

Recently, Korman disclosed in U.S. Pat. No. 4,525,736 color modification apparatus which operates upon the color difference signals known as I and Q, rather than the primary and secondary color signals. The color signals to be corrected are selected by limit circuits which determine when the difference signals lie between prescribed boundaries in the chrominance plane. These boundaries define rectangular regions in the chrominance plane which do not correspond to the polar coordinate color corrections actually made by the colorist. As a result, the colorist may encounter difficulty in selecting the signals to be color corrected.

SUMMARY OF THE INVENTION

According to the invention, video signal color correction is accomplished by selecting for color correction areas of the chrominance plane defining sectors in polar coordinates. Both the angle and the width of the sectors can be changed to select precisely the desired signals for color correction. Specifically, video component color difference signals which only lie within a fixed hue sector are transmitted from an input to an output. Responsive to a first control signal, the difference signals are rotated through an angle which corresponds to a selected hue sector relative to the fixed hue sector in which the component color signals are to be corrected. The rotated difference signals are applied to the input to produce at the output an isolated color signal only when the difference signals lie within the selected hue sector. The width of the fixed hue sector is reduced responsive to a second control signal. Thus, the first and second control signals permit selection of the angle and the width of the sector in which the difference signals are to be color corrected.

BRIEF DESCRIPTION OF THE DRAWINGS

The features of a specific embodiment of the best mode contemplated of carrying out the invention are illustrated in the drawings in which:

FIG. 2 is a schematic block diagram of the multichannel color correction circuitry represented in FIG. 1;

FIG. 3 is a schematic block diagram of one channel of the color correction circuitry represented in FIG. 2;

FIG. 4 is a schematic block diagram of the angular hue rotation circuitry represented in FIG. 3;

FIG. 5 is a schematic block diagram of the angular hue spread circuitry represented in FIG. 3.

DETAILED DESCRIPTION OF THE SPECIFIC EMBODIMENT

Figure 1:
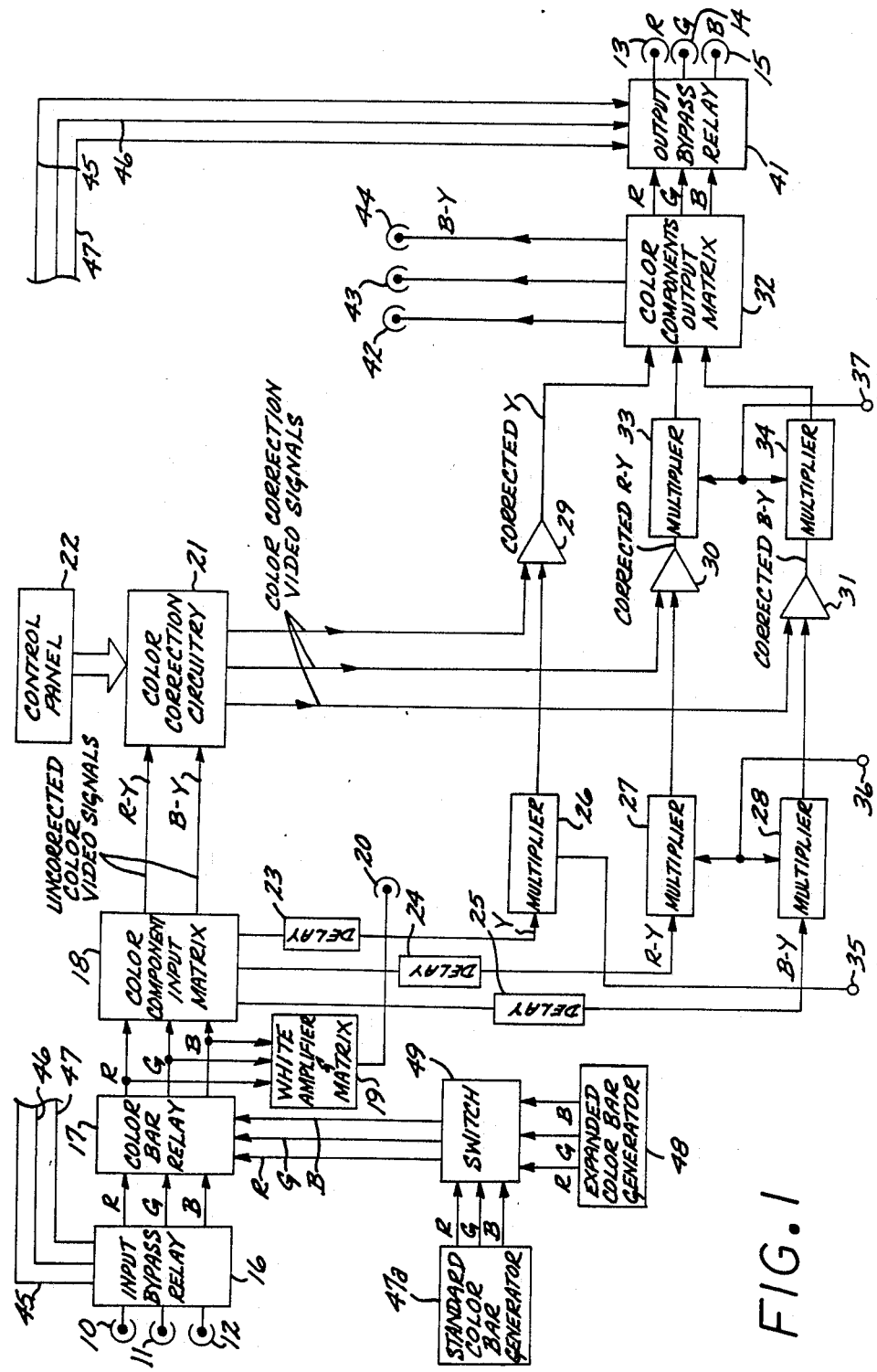
FIG. 1 is a schematic block diagram of a color correction system incorporating principles of the invention.

In FIG. 1 a color correction system has video input terminals 10, 11 and 12 for receiving red/green/blue component color signals, respectively, to be color corrected and video output terminals 13, 14 and 15 at which the corrected red/green/blue component color signals appear. Input terminals 10, 11 and 12 are connected by an input bypass relay 16, and a color bar relay 17 to a color component input matrix 18. The red/green/blue component color signals are coupled to a white amplifier and matrix 19, which produces a white signal at a video output terminal 20. In matrix 18 the red/green/blue component color signals are converted to difference signals, R-Y and B-Y, and a luminance signal Y. The difference signals are coupled to color correction circuitry 21, which as described in greater detail in connection with FIGS. 2 through 5 modifies, i.e. corrects the difference signals responsive to control signals from a control panel 22. The luminance signal and the difference signals from matrix 18 are coupled through delay circuits 23, 24 and 25, respectively, and multipliers 26, 27 and 28, respectively, to one input of summing amplifiers 29, 30 and 31, respectively. The color correction signals from circuitry 21 are coupled to the other input of each of summing amplifiers 29, 30 and 31 for combining the luminance and difference signals with the color correction signals. The corrected luminance signal appears at the output of summing amplifier 29. The corrected difference signal R-Y appears at the output of summing amplifier 30. The corrected difference signal B-Y appears at the output of summing amplifier 31. Summing amplifier 29 is directly connected to a color component output matrix 32. Summing amplifier 30 is connected by a multiplier 33 to matrix 32. Summing amplifier 31 is connected by a multiplier 34 to matrix 32.

A control terminal 35 to which a luminance level control signal (e.g., a range of + or −5 volts DC) is applied is connected to multiplier 26, to permit adjustment of the level of the luminance signal Y. A control terminal 36 to which a saturation control signal (e.g., a range of + or −5 volts DC) is applied is connected to multipliers 27 and 28 to permit adjustment of the saturation level of the uncorrected R-Y and B-Y difference signals. As a result, it is possible to reduce, to the point of black and white if desired, the saturation of the uncorrected portions of the color signals. A control terminal 37 to which a saturation level control signal (e.g., a range of + or −5 volts DC) is applied is connected to multipliers 33 and 34 to permit adjustment of the saturation level of the corrected R-Y and B-Y difference signals.

The red/green/blue component color signals from matrix 32 are coupled through an output bypass relay 41 to video output terminals 13, 14 and 15, respectively. Corrected luminance signal Y and difference signals R-Y and B-Y pass directly through matrix 32 to video output terminals 42, 43 and 44, respectively. Matrix 18 and 32 are conventional circuits for converting between red/green/blue component color signals and luminance and difference signals. Video buses 45, 46 and 47 are connected between input bypass relay 16 and output bypass relay 41 to permit direct transmission of the red/green/blue component color signals from input terminals 10, 11 and 12 to output terminals 13, 14 and 15, bypassing the color correction circuitry.

For purposes of testing the described color correction system and facilitating the establishment of the desired color correcting control signals by the colorist, a standard six color bar generator 47a and an expanded thirty color bar generator 48 are provided. Color bar generator 47a produces red/green/blue component color signals representing a color chart with a white bar and six color bars; namely, yellow, cyan, green, magenta, red and blue. As described in connection with FIGS. 11 and 12, color bar generator 48 produces red/green/blue component color signals representing an expanded thirty color bar chart. Either generator 47 or generator 48 is alternatively connected to color bar relay 17 by a switch 49. Color bar relay 17 permits the red/green/blue component color signals from one of the color bar generators to be substituted for the red/green/blue component color signals to be corrected.

Figure 11:
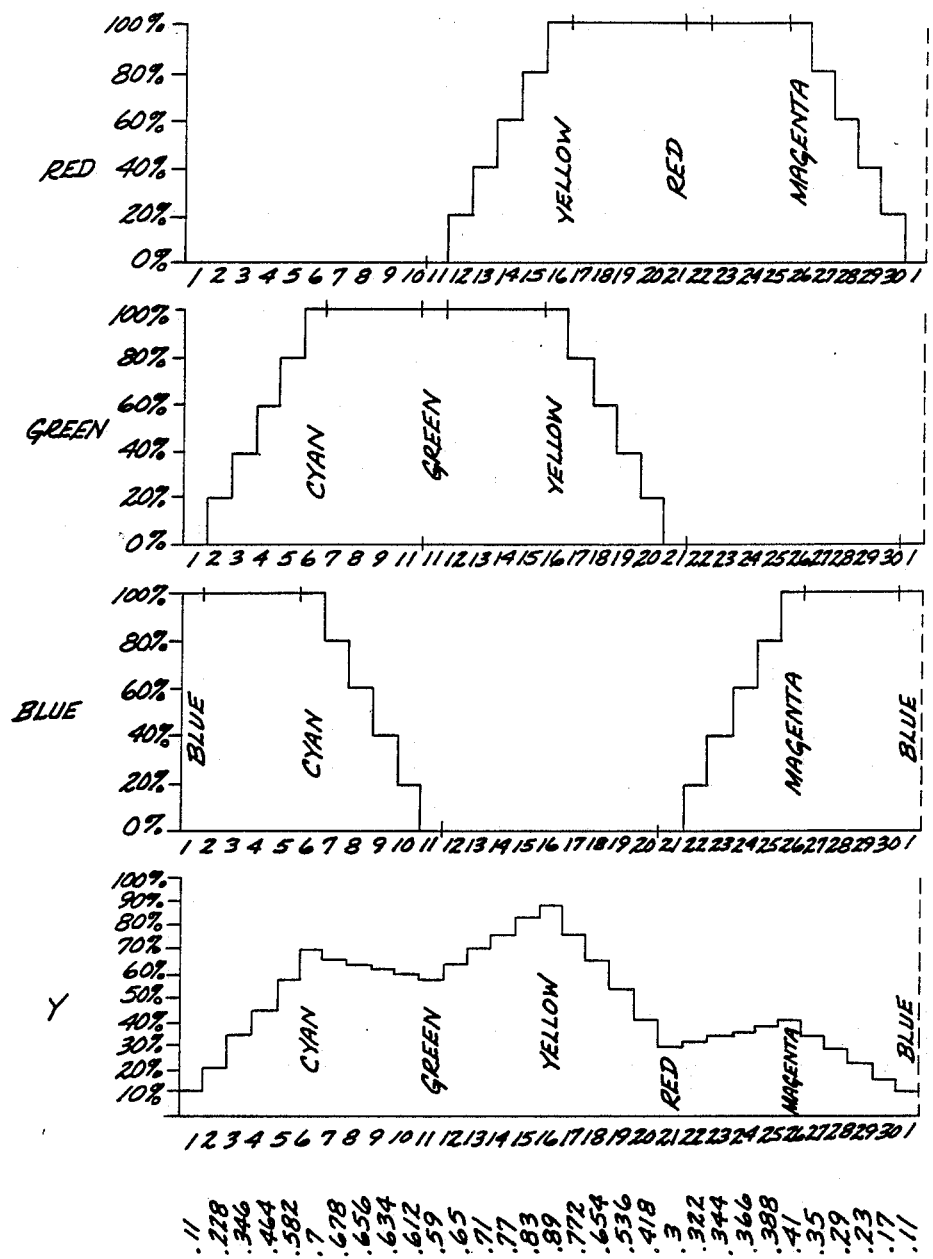
FIG. 11 is a diagram of the red/green/blue and luminance component color signals for an expanded thirty color bar chart.

Reference is made to FIG. 11 for diagrams representing the red/green/blue component color signals and the luminance signal for the expanded thirty color bar chart. The thirty color bars are represented on the abscissa and the normalized amplitude of the corresponding component signal is represented on the ordinate. Thus, for example, color bar #24, which lies between red an magenta, contains 100% of red, 0% of green and 60% of blue. (The precise normalized amplitude values of the luminance signal are presented below the corresponding color bar identifying numbers on the abscissa.) The color bars corresponding to the component (primary) color signals (i.e. color bars #1, 11 and 21) contain 100% of the corresponding component color signal and 0% of the remaining component color signals. The color bars corresponding to the secondary hues cyan, yellow and magenta (i.e. color bars #6, 16 and 26) contain 100% of two of the component color signals and 0% of the third (e.g. for yellow, 100% of red, 100% of green and 0% of blue). Each of the component color signals is 100% of green and 0% of blue). Each of the component color signals is 100% between the hues adjacent thereto (e.g. the red component color signal is 100% between yellow and magenta) and drops off in stepwise fashion at 20% increments moving away from the adjacent hues. The result is that on both sides of the color bars corresponding to the primary and secondary hues (color bars #1, 6, 11, 16, 21 and 26), the color bar is produced by the combination of a step-wise component and a 100% component (e.g. color bars #17 to 20 are composed of a step-wise component of green and a 100% component of red.).

Figure 12:
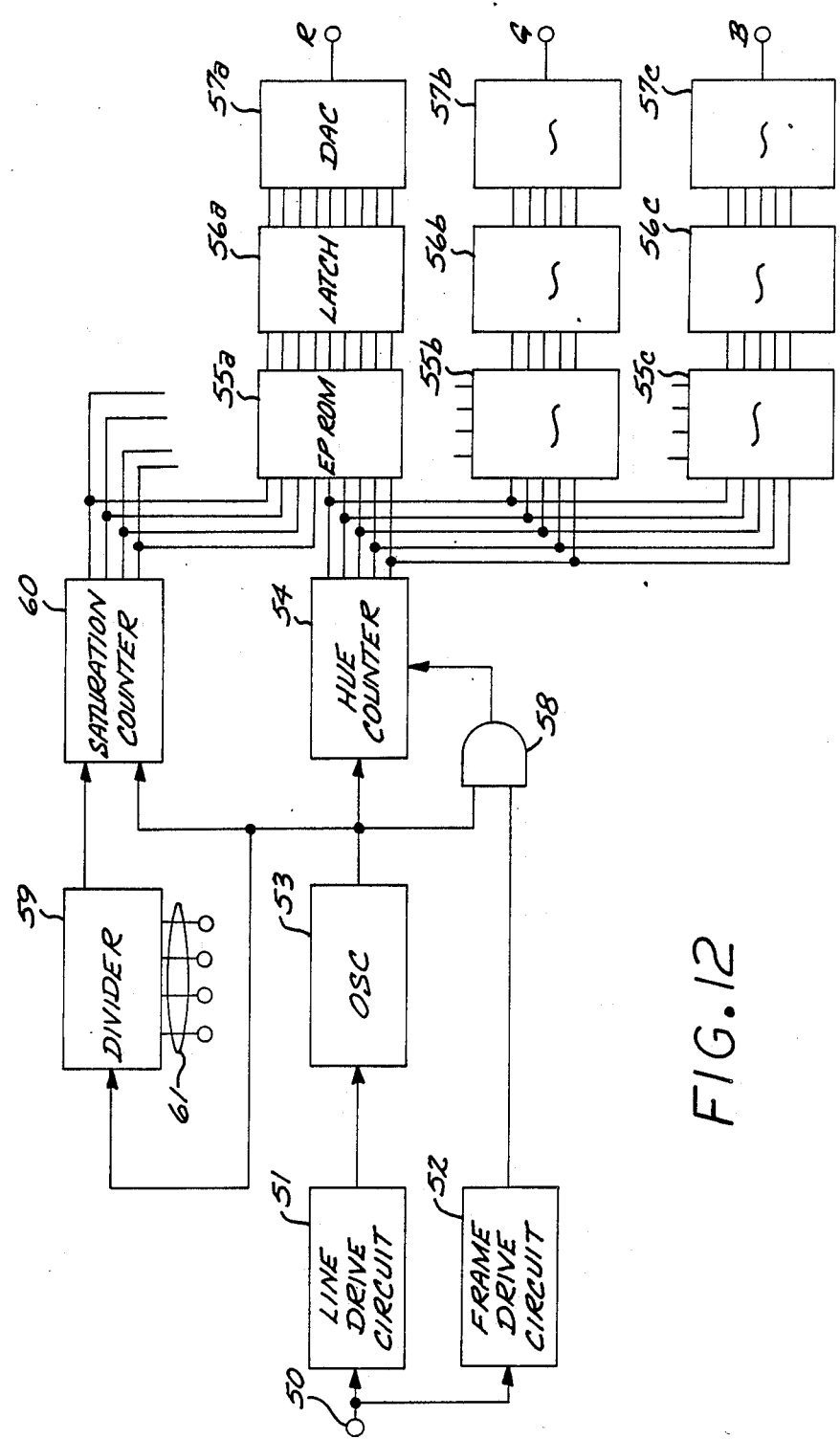
FIG. 12 is a schematic diagram of a color bar generator for producing component red/green/blue signals to create an expanded thirty color bar chart.

As depicted in FIG. 12, color bar generator 48 has an input terminal 50 for receiving a composite sync signal containing both horizontal and vertical synchronizing pulses. Terminal 50 is connected to a line drive circuit 51 and a frame drive circuit 52. Circuit 51 produces for each line of the video raster one line drive pulse which is applied as a synchronizing signal to an oscillator 53. Oscillator 53 produces pulses equal in number to the color bars to be displayed, i.e. thirty color bars. (If desired, thirty one colors bars could be displayed, the pure blue color bar, bar #1, being repeated at the end of the chart). Oscillator 53 drives a hue counter 54. Memory devices (EPROM) 55a, 55b and 55c, latches 56a, 56b and 56c, and digital-to-analog converters (DAC) 57a, 57b and 57c are provided to generate the red, green, and blue component color signals representing the color bars. DACs 57a, 57b and 57c are connected to switch 40 (FIG. 1). The output terminals of hue counter 54, six in number, are connected as address inputs to EPROMs 55a, 55b and 55c, in which are stored digital signals representing the red, green and blue component signal values shown in FIG. 11 for the various color bars. For example, in the memory location for color bar #24 in EPROM 55a a value corresponding to 100% of full amplitude is stored to represent the component red signal, in EPROm 55b a value corresponding to zero is stored, and in EPROM 55c, a value corresponding to 60% of full amplitude is stored. Latches 56a, 56b and 56c store the outputs of EPROMs 55a, 55b and 55c, respectively, while these outputs are converted to analog signals by DACs 57a, 57b and 57c, respectively.

The addresses from hue counter 54 are coordinated with the digital signals stored in the memory locations of EPROMs 55a, 55b, and 55c, so that during each video raster line, the digital signals generating the color bars are delivered by EPROMs 55a, 55b and 55c in the order shown in FIG. 11, i.e. color bars #1 to 30 in sequence. Once each frame, circuit 52 produces a drive pulse which is coupled through an AND gate 58 to the reset terminal of hue counter 54. For synchronization purposes, the output of oscillator 53 is also coupled to AND gate 58.

Preferably, the color bar generator is also capable of producing a plurality, e.g. fifteen different levels of saturation for each color bar, increasing in saturation from top to bottom. To this end, the output of oscillator 53 is connected to a divider 59, which produces one pulse for each of a plurality, e.g. sixteen, of applied pulses. The divisor can be changed by changing the binary signals applied to control terminals 61, e.g. if the signals are 1, 1, 1, 1, the divisor is one and only one level of saturation is produced and if the signals are 0, 0, 0, 0, the divisor is sixteen and sixteen levels of saturation are produced. The output of divider 59 is connected to a saturation counter 60. The outputs of saturation counter 60, four in number, are connected as address inputs to EPROMs 55a, 55b and 55c. In addition to digital signals representing the values of full saturation for each of the thirty color bars, EPROM 55a, 55b and 55c also store digital signals representing fourteen other saturation levels between zero and 100% for each color bar. In other words, each of EPROMs 55a, 55b and 55c have four hundred fifty memory locations. Each of the fifteen saturation levels are displayed on each color bar from top to bottom in decreasing saturation level, i.e., 100% is at the top of the color bar and 0% is at the bottom of the color bar. The result is a grid of changing hue in horizontal rows and changing saturation in vertical columns. After each sixteen lines of the video raster, the memory locations of EPROMs 55a, 55b and 55c corresponding to the hue for a different saturation level are addressed. The addresses generated by saturation counter 60 are coordinated with the digital signals stored in the memory locations of EPROMs 55a, 55b and 55c so as to address a group of memory locations in which are stored, the hue representative of the digital signals corresponding to one saturation level after the other. Thus, in the course of generation of each frame of the color bar chart, the proper memory location of each of EPROMs 55a, 55b and 55c is addressed in succession to provide an image which is a grid of horizontal rows of the same saturation and vertical columns of the same hue. To select a different number of saturation levels, the binary signals applied to control terminals 61 are simply changed to change the divisor.

Figure 6:
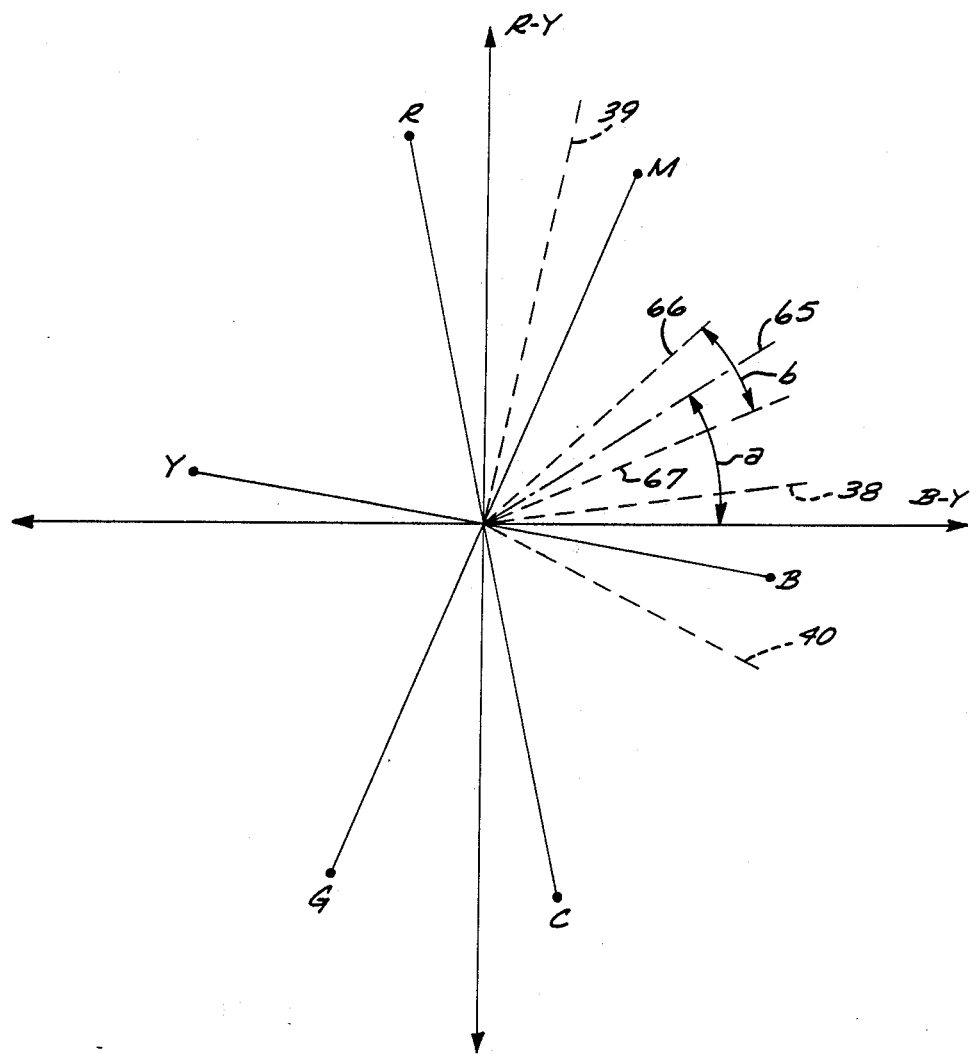
FIG. 6 is a diagram of the chrominance plane with the difference signals, R-Y and B-Y, as coordinates.

For a description of how the invention selects the desired hue angle and hue spread for color correction, reference is made to FIG. 6, which is a chrominance plane representation of the six primary and secondary component color signals. The abscissa represents the component color difference signal B-Y, i.e., blue minus luminance. The ordinate represents the component color difference signal R-Y, i.e., red minus luminance. The letters M, R, Y, G, C, and B represent the primary and secondary component color signals, magenta, red, yellow, green, cyan, and blue in a polar coordinate system. The angle represents the hue, i.e., color, and the radius represents the saturation level. A dot-dashed line 65 represents a desired hue angle, in this case between magenta and blue, to be color corrected at an angle relative to the B-Y axis. Dashed lines 66 and 67 represent a desired sector with a color spread of angle b about hue angle a over which the color correction is desired. The invention permits both the hue angle a and the sector spread or width b to be controlled so as to select any desired sector in the chrominance plane over which to introduce correction of the component color signals.

Reference is made to FIG. 2 for a description of color correction circuitry 21, which comprises a plurality of parallel channels CH1, CH2 and CH3. Any number of further channels could also be provided, depending upon the number of selective color corrections to be made. The R-Y and B-Y uncorrected video color signals from matrix 18 are coupled to each channel. A different set of five correction control signals is applied to each of channels CH1, CH2 and CH3 as represented at 68, 69 and 70. The correction control signals are DC, e.g., +or −0 to 5 volts, as distinguished from video, and remain fixed in value once set until a different correction is to be made.

The correction control signals are generated by the adjustment of potentiometers on control panel 22 by the colorist. Alternatively, the color control signals generated by the colorist at control panel 22 could be stored in a computer memory and called up by the computer in real time as the red, green, blue component color signals are being transmitted from input terminals 10, 11 and 12 to output terminals 13, 14 and 15 responsive to a frame counter in well-known fashion. Responsive to each set of control signals, a different color correction is introduced in each of channels CH1, CH2 and CH3. The outputs of channels CH1, CH2 and CH3 are additively combined such as, for example, by an operational amplifier (not shown) to produce R-Y, B-Y and Y video color correction signals which are added to the uncorrected video color signals B-Y, R-Y and Y from matrix 18 in summing amplifiers 29, 30 and 31, respectively (FIG. 1).

Reference is made to FIG. 3 for a description of channel CH1. Channels CH2, CH3 and any further channels desired to be added are identical to channel CH1. The R-Y and B-Y uncorrected video signals are applied to a color selection circuit "s" at an angular hue rotation circuitry 71 The set of five correction control signals from control panel 22 are applied, respectively, to input control terminals 72, 73, 74, 75 and 76. A control signal representative of the selected hue angle is applied to input terminal 72. Terminal 72 is connected to a sine generator 83 and a cosine generator 84. A signal representative of the sine of the selected hue angle is coupled from generator 83 to circuitry 71. A signal representative of the cosine of the selected hue angle is coupled from generator 74 to circuitry 71. Responsive to these signals, circuitry 71 presents at an output terminal 86 a video signal having a maximum amplitude when the R-Y and B-Y uncorrected video signals form the selected hue angle and a decreasing amplitude moving away from the selected hue angle within the fixed hue sector and a zero amplitude for all other hue angles, i.e., all hue angles outside the fixed hue sector. Responsive to a control signal representative of the selected hue spread applied to terminal 73, hue spread circuitry 78 reduces the width of the sector over which the signal appearing at terminal 86 is non-zero. The hue spread circuitry is coupled between the angular hue rotation circuitry 71 and color correction multipliers 88–90, described more fully below, for defining a hue sector containing the hue angle and representing hue boundaries outside of which hue signals representing hues outside of the hue sector are not passed to the multipliers 88–90. Thus, circuitry 78 produces an isolated color signal only when the R-Y and B-Y uncorrected video signals lie within the selected hue sector, which is the same or narrower than the fixed hue sector transmitted by circuitry 71. The isolated or selected color signal is applied to one input of an R-Y multiplier 88, one input of a B-Y multiplier 89 and one input of a luminance multiplier 90. Terminal 74 is connected to the other input of multiplier 90 to multiply the signal representative of luminance correction by the isolated color signal. Terminal 75 is connected to the other input of multiplier 89 to multiply the signal or correction factor representative of the B-Y hue correction by the isolated color signal. Terminal 76 is connected to the other input of multiplier 88 to multiply the signal or correction factor representative of the R-Y hue correction by the isolated color signal. As a result, video signals representative of the color correction prescribed by the control signals applied to terminals 74, 75 and 76 over the hue sector prescribed by the control signals applied to terminals 72 and 73 are produced by multipliers, 88, 89 and 90. The signals are combined with corresponding video color correction signals from the other channels by means of operational amplifiers 62, 63 and 64.

Reference is made to FIG. 4 for a more detailed description of angular hue rotation circuitry 71. Multipliers 91, 92, 93 and 94 rotate the R-Y and B-Y uncorrected video signals under control of the sine and cosine representative signals. To this end, the R-Y signal and the cosine representative signal are applied to the inputs of multiplier 91; the B-Y signal and the sine representative signal are applied to the inputs of multiplier 92; the R-Y signal and the sine representative signal are applied to the inputs of multiplier 93; and the B-Y signal and the cosine representative signal are applied to the inputs of multiplier 94. The outputs of multiplier 91 and 92 are combined and applied to one input of a matrixing circuit 95. The outputs of multipliers 93 and 94 are combined and applied to the other input of matrixing circuit 95.

Figure 8:
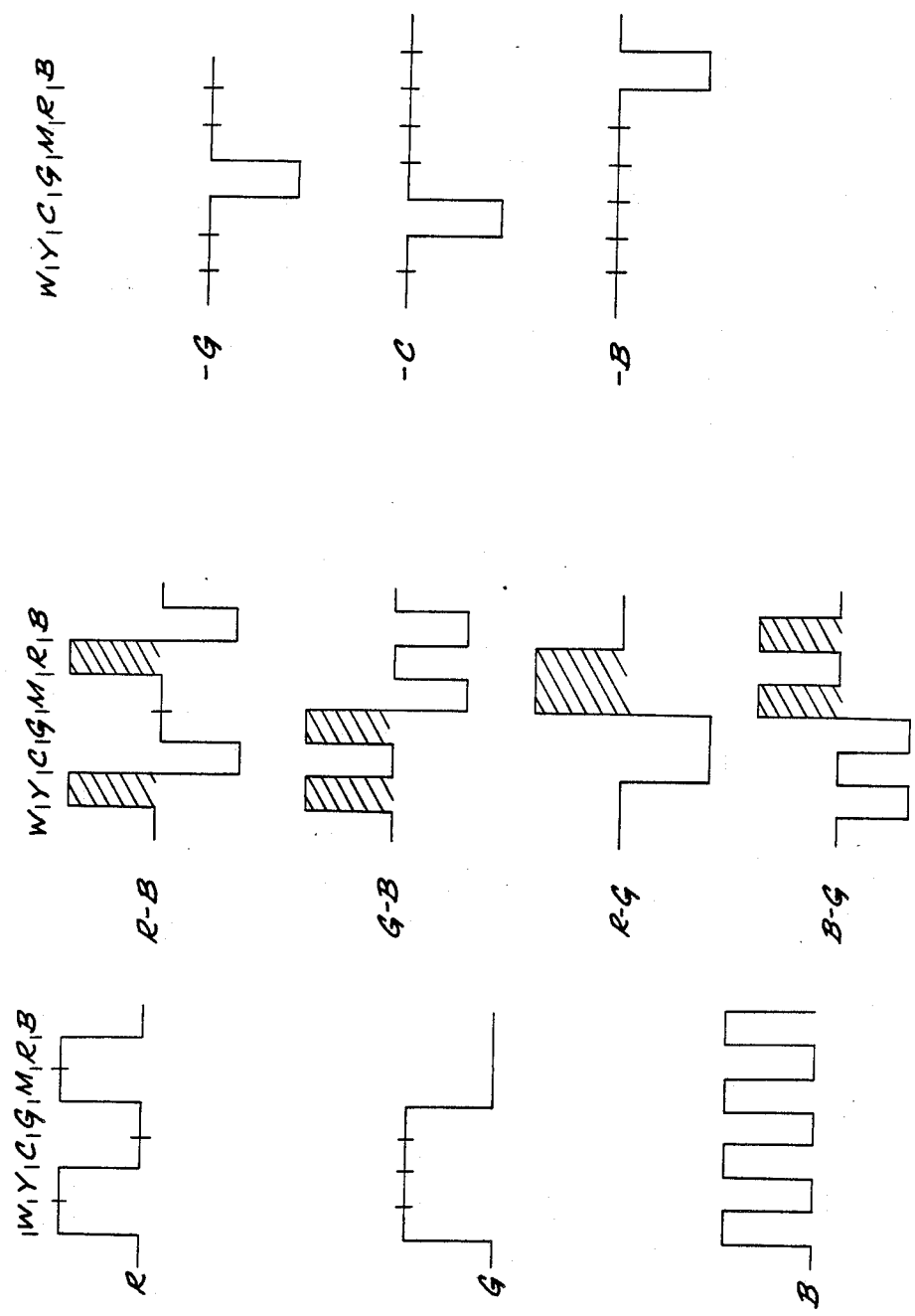
FIG. 8 is a collection of diagrams representing the component color signals for a standard six color bar chart

In well known fashion, matrixing circuit 95 produces four color difference signals, namely, red minus green (R-G), red minus blue (R-B), green minus blue (G-B) and blue minus green (B-G). In this connection, reference is made to FIG. 8 for diagrams depicting red, green, and blue color component signals (left in FIG. 8), the difference signals produced by matrixing circuit 95 for a standard six color bar chart (center in FIG. 8), and the signals produced at the output of the angular hue rotation circuitry (right in FIG. 8). The R-G, R-B, G-B and B-G difference signals are applied to clippers 96, 97, 98 and 99, which remove the positive going (shaded in FIG. 8) portions from the difference signals. The negative going portions of the R-G and B-G difference signals are coupled to a non-additive mixer. 100 having an output terminal 85. The negative going portions of the R-G and R-B difference signals are applied to a non-additive mixer 102 having an output terminal 86. The negative going portions of the R-B and G-B difference signals are applied to a non-additive mixer 104 having an output terminal 87. In the left column of FIG. 8, the R, G, and B component color signals are shown for a standard six color bar chart. In the center column, the difference signals R-B, G-B, R-G and B-G are shown. Clippers 96 to 99 remove the positive going portions of these signals. Non-additive mixers 100, 102 and 104 transmit only the most negative signal applied to their respective inputs, suppressing the positive going portions. The signals produced at output terminals 85, 86 and 87, by virtue of the processing of the stated difference signals by clippers 96 to 99 and mixers 100, 102 and 104 are depicted in the right column of FIG. 8 for a standard six color bar chart. As illustrated, the opposite, i.e., negative of the green (G) component signal appears at the terminal 85, the opposite of the cyan (C) component appears at the terminal 86, and the opposite of the blue (B) component signal appears at terminal 87. In summary, clippers 96 and 99 and mixers 100, 102 and 104 serve to transmit from matrixing circuit 95 to terminal 86 only video component color difference signals which lie within a fixed hue sector of preferably about 106°, i.e., the sector between green and blue centered on cyan. Only difference signals that lie within a sector between yellow and cyan and centered on green are transmitted to terminal 85. Only difference signals that lie within a sector between cyan and magenta and centered on blue are transmitted to terminal 87. Since the hue transmitted to output terminal 86 is cyan, which is located at an angle of −76.6° on the chrominance plane represented in FIG. 6, the selected hue angle in general is angle a minus 76.6°.

Figure 7:
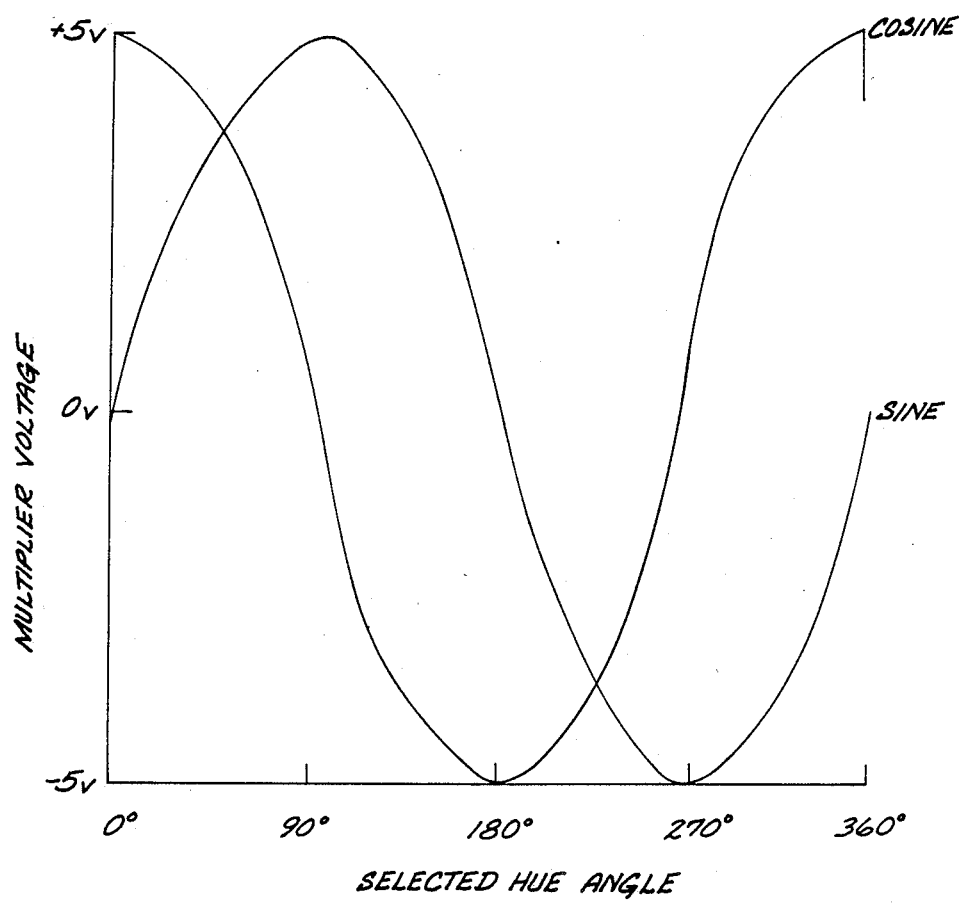
FIG. 7 is a diagram of sine and cosine wave forms used to describe the operation of the invention.

By varying the selected hue angle, multipliers 91 to 94 in essence rotate the uncorrected video signals applied thereto so as to permit any desired sector of hue in the chrominance plane found in the color difference signals, R-Y, B-Y, to be transmitted to terminals 85, 86 and 87 in place of green, cyan and blue. A few examples will illustrate this point with reference to FIG. 7, which represents the sine and cosine signals applied to multipliers 91 to 94 as a function of the selected hue angle. If the selected hue angle is 0°, the cosine signal is a maximum positive value and the sine signal is zero. As a result, the R-Y difference signal and the B-Y difference signal are transmitted at full amplitude by multipliers 91 and 94, respectively, to matrixing circuit 95, while transmission of the difference signals by multipliers 92 and 93 is blocked. When the selected hue angle is +90°, multiplier 93 transmits the R-Y difference signal to input terminal 81, and multiplier 92 transmits the B-Y difference signal to input terminal 80 at full amplitude, while transmission through multipliers 91 and 94 is blocked. With reference to FIG. 6, this is equivalent to rotating the R-Y and B-Y axes 90° in a counterclockwise direction and the hue sectors transmitted to output terminals 85, 86 and 87 change. Thus, difference signals centered at a hue between blue and magenta represented by a dashed line 38 at an angle 13.4° in relation to the origin (positive B-Y axis) in FIG. 6 are transmitted to output terminal 86, difference signals centered at a hue between red and magenta represented by a dashed line 39 at an angle of 77.1° in FIG. 6 are transmitted to output terminal 87, and difference signals centered at a hue between cyan and blue represented by a dashed line 40 at an angle of 330.8° in FIG. 6 are transmitted to output terminal 85. When the selected hue angle is 180°, multipliers 91 and 94 invert the polarity of the R-Y and B-Y difference signals, respectively, while transmission through multipliers 92 and 93 is blocked. This is equivalent to rotating the R-Y and B-Y axes in FIG. 6 by 180°.

Figure 9:
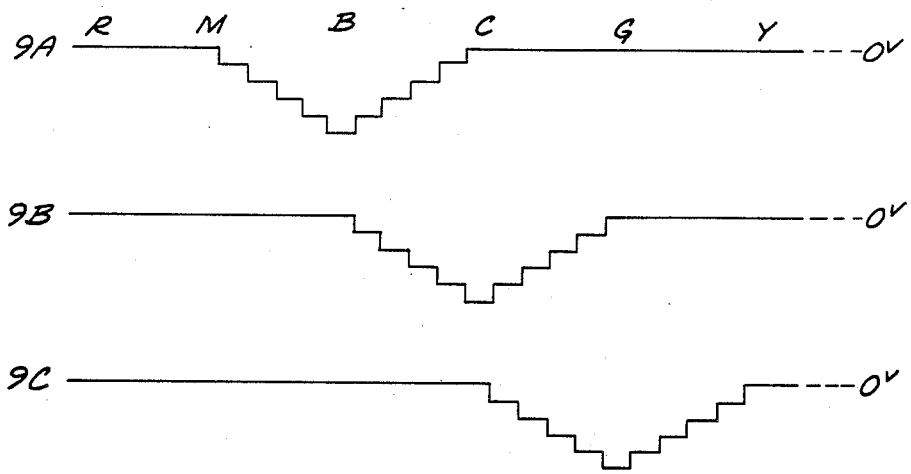
FIGS. 9A, 9B and 9C are diagrams representing the output signals of the angular hue rotation circuitry of FIG. 3 for an expanded thirty color bar chart.

Assuming application of the expanded thirty color bar difference signals to angular hue rotation circuitry 71, and a selected hue angle of 0°, FIGS. 9A, 9B and 9C represent the signal amplitude in volts at terminals 87, 86 and 85, respectively. As illustrated, the signal at terminal 87 is a maximum negative value at blue, drops off toward magenta and cyan, and is zero for all other hues, the signal at terminal 86 is a maximum negative value at cyan, drops off toward blue and green, and is zero at all other hues, the signal at terminal 85 is a maximum negative value at green, drops off toward cyan and yellow, and is zero at all other hues. As the selected hue angle increases and decreases from zero, the signals at terminals 87, 86 and 85 change in value, shifting as a unit back and forth in the hue spectrum relative to their values illustrated in FIGS. 9A, 9B and 9C.

With reference to FIG. 5, which depicts the hue spread circuitry, terminals 85 and 87 (FIG. 4) are connected to a non-additive mixer 110. The output of non-additive mixer 110 is coupled by an operational amplifier 111, supplying a preferably fixed gain to the signal from the non-additive mixer 110, to one input of a non-additive mixer 112. Terminal 86 is connected by an invertor 114 to the other input of non-additive mixer 112. The output of non-additive mixer 112 is coupled by a negative signal clipper 115 to a terminal 116, which serves as the output for circuitry 78. Terminal 73 is connected by a resistor 117 to the input of operational amplifier 111.

Figure 10:
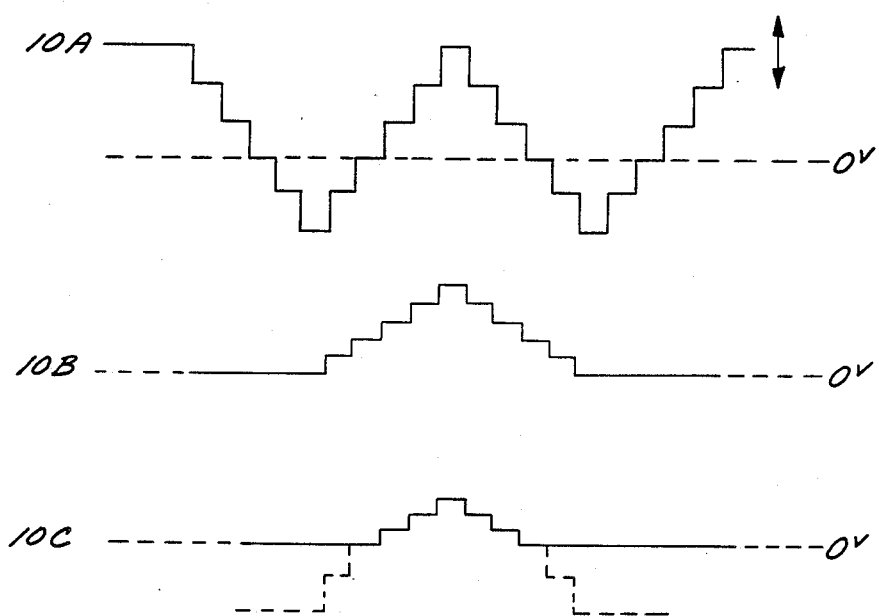
FIGS. 10A, 10B and 10C are diagrams representing the signals generated by the angular hue spread circuitry of FIG. 5 for an expanded thirty color bar chart.

Mixers 110 and 112 transmit the more negative of the signals applied to their inputs. Therefore, the wave form of the signal at the output of mixer 110 is a combination of FIGS. 9A and 9C. The signal representing the selected hue spread applied to terminal 73 serves to bias the signal at the output of mixer 110 upwardly or downwardly, depending upon the angular width of the selected hue sector. This is illustrated in FIG. 10A, which represents the output of operational amplifier 111. As indicated by the two-headed arrow, the signal produced at amplifier 111 responsive to the expanded color bar component difference signals moves upwardly or downwardly relative to zero volts depending on the amplitude of the selected hue spread representative control signal. FIG. 10B represents the signal at terminal 86 after passing through invertor 114 responsive to the expanded color bar component difference signals, which is fixed relative to zero volts. FIG. 10C represents the signal at the output of clipper 115. As the bias applied by the signal at terminal 73 increases in a positive direction, more of the signal at the output of mixer 112 lies above zero volts and the angle of the selected sector widens because clipper 115 passes a wider band of hue, and vice-versa. As previously described, only when the uncorrected video signals applied to circuitry 71 lie within the selected hue sector about the selected hue angle is a signal produced at terminal 116. With reference to FIGS. 10A, 10B and 10C, operation of the invention may be understood by viewing changes in the selected hue angle as lateral shifting of the wave forms and changes in the selected hue spread as up and down shifting of wave forms 10A and 10C.

Figure 13:
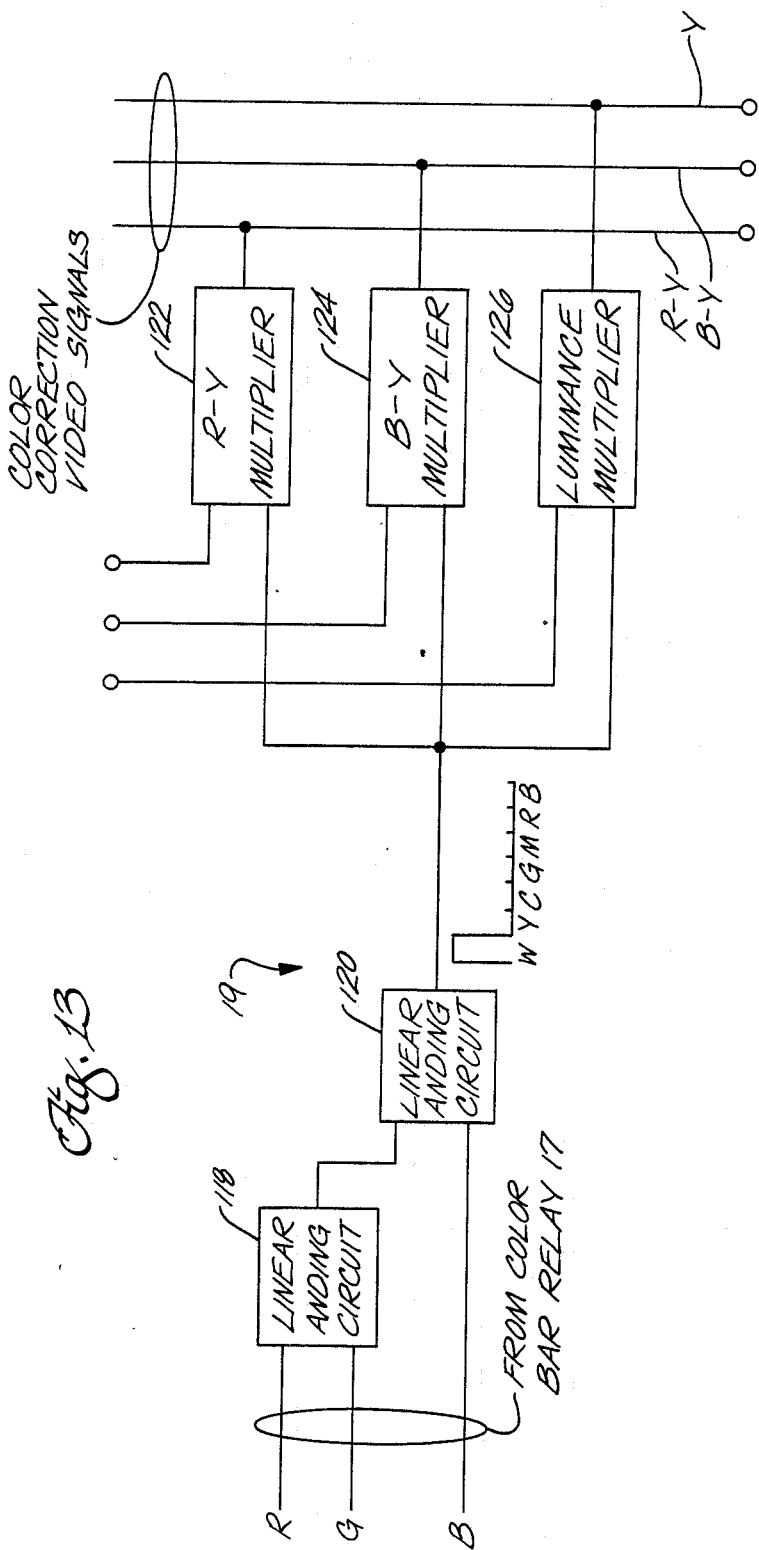
FIG. 13 is a schematic diagram of a portion of a white amplifier and matrix.

The white amplifier and matrix 19, shown in FIG. 1, includes a pair of linear ANDing circuits 118 and 120 (FIG. 13), which is a circuit analogous to an analog form of an ANDing circuit for combining the three RGB signals together so that the output of the second linear ANDing circuit 120 contains only the white signal portions from each of the red, green and blue signals. The output of the pair of linear ANDing circuits is shown in FIG. 13. The output is then applied to a trio of multipliers 122, 124 and 126, in a manner similar to the application of the output from the angular hue spread circuitry 78 to the R-Y multiplier 88, B-Y multiplier 89 and luminance multiplier 90. The outputs of the three multipliers can then be combined with the output signals from the color correction channels on the common output buss for producing a corrective video output.

The described embodiment of the invention is only considered to be preferred and illustrative of the invention concept; the scope of the invention is not to be restricted to such embodiment. Various and other numerous arrangements may be devised by one skilled in the art without departing from the spirit and scope of this invention. The invention may be employed in a telecine film chain of in video tape-to-video tape conversion equipment, or any other setting in which video component color signals appear.

I claim:

1. A component color correction system for manipulating color signals consisting at least of two color difference signals representing hue and saturation as angle and magnitude in polar coordinates in a chrominance plane, the system comprising:
    input means for providing two color difference signals;
    color selection means for receiving said two color difference signals, a signal representing a selected hue angle, and a signal representing a selected hue angle, and a signal representing a selected hue spread, and producing a selected signal proportional to the saturation of the color difference signals in the hue region selected by the hue angle and spread signals;
    color correction means receiving the selected signal output from the color selection means and correction factors corresponding to each color difference signal independent of the selected hue angle, and producing correction signals representing the product of the selected signal from the color selection means and the respective correction factor; and
    combining means for combining the color difference signals with the respective correction signal to produce corrected color video signals.

2. The system of claim 1 wherein the color selection means includes sine and cosine generating means for rotating in response to the signal representing the hue angle the color signals from the input means through an angle in the chrominance plane so that a portion of the color signals having the defined hue angle can be isolated.

3. The system of claim 1 wherein the color selection means includes a matrixing circuit for producing further color difference signals to be used for forming the selected signal to be produced by the color selection means.

4. The system of claim 3 wherein the color selection means includes means coupled to the matrixing circuit for producing separate signals representing at least three hues.

5. The system of claim 4 wherein the separate signal producing means includes first, second and third output circuits, the first and third output circuits being coupled to a non-additive mixer having an output coupled to means for maintaining a gain of the output of the non-additive mixer.

6. The system of claim 1 wherein the color correction means includes means for multiplying the selected signal output from the color selection means by the correction factors to adjust at least the hue of the correction signals.

7. The system of claim 6 wherein the multiplying means includes means for adjusting the magnitude representing the saturation of the correction signals.

8. The system of claim 7 wherein the multiplying means includes means for simultaneously adjusting the angle and magnitude representing the hue and saturation of the correction signals from the color correction means.

9. The system of claim 6 wherein the multiplying means further includes means for producing a luminance correction signal using the selected signal output from the color selection means.

10. The system of claim 1 wherein the input means includes a color input matrix for providing uncorrected color difference signals to be corrected and including means for adjusting the level of the uncorrected color difference signals prior to being corrected by a respective correction signal.

11. The system of claim 10 wherein the color input matrix provides a luminance signal and wherein the combining means includes means for correcting the luminance signal with a respective correction signal from the color correction means.

12. The system of claim 1 further comprising a color input matrix for accepting color video input signals and producing color difference signals to the input means and means coupled to the color input matrix for generating expanded color bar signals.

13. They system of claim 12 wherein the means for generating expanded color bar signals includes means for producing color bar signals having expanded hues.

14. The system of claim 12 wherein the means for generating expanded color bar signals includes means for producing color bar signals having expanded saturations.

15. The system of claim 1 further comprising a color input matrix coupled to the input means for accepting color video signals, a source of color video signals having an output coupled to the color input matrix and a white amplifier and matrix coupled to the output of the color video signal source for adjusting the level of a white signal.

16. The system of claim 1 further comprising means for supplying hue and luminance correction factor signals, means for multiplying the selected signal produced by the color selection means and the hue correction factor signals to produce the correction signals and means for multiplying the selected signal produced by the color selection means and the luminance correction factor signal to produce a luminance correction signal.

17. A method for manipulating color signals consisting at least of two color difference signals representing hue and saturation as angle and magnitude in polar coordinates in a chrominance plane, the method comprising the steps of:
providing two color difference signals;
receiving said two color difference signals, a signal representing a selected hue angle, and a signal representing a selected hue spread, and producing a selected signal proportional to the saturation of the color difference signals in the hue region selected by the hue angle and spread signals;
receiving the selected signal and correction factors corresponding to each color difference signal independent of the selected hue angle, and producing correction signals representing the product of the selected signal and the respective correction factor; and
combining the color difference signals with the respective correction signal to produce corrected color video signals.

18. The method of claim 17 wherein the step of producing a selected signal includes the step of rotating using signals generated by sine and cosine generating means in response to the signal representing the hue angle the color signals from the first set of circuits through an angle in the chrominance plane so that a portion of the color signals having the defined hue angle can be isolated.

19. The method of claim 17 wherein the step of producing a selected signal includes the step of producing further color difference signals to be used for forming the selected signal.

20. The method of claim 19 wherein the step of producing further color difference signals includes the step of producing separate signals representing at least three hues.

21. The method of claim 20 wherein the step of producing separate signals includes the step of producing signals from first, second and third output circuits, the first and third output circuits being coupled to a non-additive mixer having an output coupled to means for maintaining a gain of the output of the non-additive mixer.

22. The method of claim 17 wherein the step of producing correction signals includes the step of multiplying the selected signal by the correction factors to adjust at least the hue of the correction signals.

23. The method of claim 22 wherein the step of multiplying includes the step of adjusting the magnitude representing the saturation of the correction signals.

24. The method of claim 23 wherein the step of multiplying includes the step of simultaneously adjusting the angle and magnitude representing the hue and saturation of the correction signals.

25. The method of claim 22 wherein the step of multiplying further includes the step of producing a luminance correction signal using the selected signal.

26. The method of claim 17 further comprising the step of adjusting the level of the color difference signals prior to the step of combining.

27. The method of claim 26 wherein the step of providing color difference signals includes the step of providing a luminance signal to the second set of circuits and wherein the step of combining includes the step of combining the luminance signal with a luminance correction signal.

28. The method of claim 17 further comprising the steps of accepting color video input signals in a color input matrix and producing color difference signals and supplying expanded color bar signals to the color input matrix.

29. The method of claim 28 wherein the step of supplying expanded color bar signals includes the step of supplying color bar signals having expanded hues.

30. The method of claim 28 wherein the step of supplying expanded color bar signals includes the step of supplying color bar signals having expanded saturations.

31. The method of claim 17 further comprising the step of producing a white level correction signal in a white amplifier and matrix.

32. The method of claim 17 further comprising the steps of supplying hue and luminance correction factor signals, multiplying the selected signal and the hue correction factor signals to produce the correction signals and multiplying the selected signal and the luminance correction factor signal to produce a luminance correction signal.

* * * * *

UNITED STATES PATENT AND TRADEMARK OFFICE
CERTIFICATE OF CORRECTION

PATENT NO. : 4,954,881

DATED : September 4, 1990

INVENTOR(S) : Michael C. Kaye

It is certified that error appears in the above-identified patent and that said Letters Patent is hereby corrected as shown below:

Column 3, line 63, "an" should read --and--.

Column 4, line 45, "EPROm 55b" should read --EPROM 55b--.

Column 5, line 52, before "relative", insert --a--.

Column 6, line 27, "71 The" should read --71. The--.

Column 10, line 8, claim 1, after "hue angle," delete "and a signal representing a selected hue".

Column 10, line 9, claim 1, before "and a signal" delete "angle,".

Column 10, line 14, between "means" and "receiving", insert --for--.

Column 11, line 13, "They" should read --The--.

Column 12, line 37, after "signal" delete "to the second set of circuits".

Signed and Sealed this

Fourth Day of February, 1992

Attest:

HARRY F. MANBECK, JR.

Attesting Officer

Commissioner of Patents and Trademarks